Figure 1:
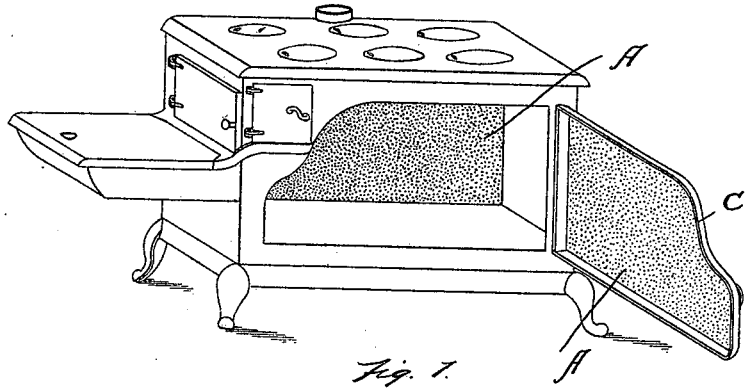

No. 641,630. Patented Jan. 16, 1900.
F. W. KING.
RADIANT OVEN FOR COOKING STOVES.
(Application filed Apr. 7, 1898.)
(No Model.)

WITNESSES
Chas. Wisner
O. M. Clough.

INVENTOR
Frederick W. King
By Parker V. Burton
Attorneys.

THE NORRIS PETERS CO., PHOTO-LITHO., WASHINGTON, D. C.

UNITED STATES PATENT OFFICE.

FREDERICK W. KING, OF DETROIT, MICHIGAN, ASSIGNOR TO THE MICHIGAN STOVE COMPANY, OF SAME PLACE.

RADIANT OVEN FOR COOKING-STOVES.

SPECIFICATION forming part of Letters Patent No. 641,630, dated January 16, 1900.

Application filed April 7, 1898. Serial No. 676,841. (No model.)

*To all whom it may concern:*

Be it known that I, FREDERICK W. KING, a citizen of the United States, residing at Detroit, county of Wayne, State of Michigan, have invented a certain new and useful Improvement in Radiant Ovens for Cooking-Stoves; and I declare the following to be a full, clear, and exact description of the invention, such as will enable others skilled in the art to which it pertains to make and use the same, reference being had to the accompanying drawings, which form a part of this specification.

My invention relates to cooking-stoves, and has for its object an improved surface for the interior of the oven.

This invention is shown in the drawings, in which—

Figure 2:
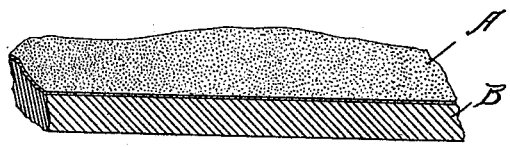

Figure 1 shows a stove in perspective, the door being open to show its interior reflecting-surface. Fig. 2 shows a small piece of iron coated, the drawing showing the thin deposit of aluminium on iron.

D is the fireplace, E the oven, and F the passage-way to the chimney. The heat is generated in the fireplace D and is carried by the gases above and below the oven and between the oven and the outer walls of the stove at the ends G and H and passes up to the chimney through the passage F.

The interior surfaces of the top and bottom of the oven and the two ends G and H, through which the heat is communicated to the oven, I leave in their natural conditions, as they form excellent radiating-surfaces.

C is the oven-door, and I is the side opposite said door. The side I is not adapted to be an original source of heat to the oven. As shown in the drawings, it is that side from behind which the heated gases pass directly to the chimney. It is also frequently a second door.

I provide the interior surface of the door C and the side I opposite thereto with a bright reflecting-surface A, adapted to reflect and not readily absorb radiant heat and light. The coating consists of a thin layer of aluminium deposited upon the surface of the iron which forms the wall I or upon a separate plate, which may lie against said wall and on the inner surface of the oven-door. When the aluminium is applied to said surfaces by the method which I employ, it is exceedingly bright, and when the door is opened catches the light and reflects it to such an extent that articles in the process of baking can be seen as plainly as when they are drawn out of the oven. This has never been accomplished by any device. So far as I know aluminium is the only material that will retain its brilliancy at any high temperature and that will not allow any substance to remain on its surface.

By the above-described arrangement of the interior surfaces of the oven those surfaces which are the original sources of heat to the oven are adapted to throw off the heat rapidly, while those surfaces which are not original sources of heat are not only prevented from retarding the action of the active surfaces by absorbing the heat and transmitting it to the outside, but are made ancillary to the heating-surfaces in that they reflect the radiant heat against parts of the article to be baked that are not directly exposed to the most efficient action of the heating-surfaces.

The heat reflected from the bright surface of the door for the most part impinges in the first instance against the opposite wall of the oven. If this has an absorbent surface, the heat so reflected is mostly lost. By making these opposite surfaces reflecting they not only assist the action of the heating-surfaces, but also mutually intensify each other's action.

It will be noticed that by the above construction and arrangement of the oven-walls surfaces whose action would otherwise be to retard the process of baking are made efficient in promoting the same, and the radiant heat is projected against all sides of the article to be baked.

The reflecting-surface produced by the aluminium deposited on the walls is superior to any other reflecting-surface of which I am aware, and the whole oven is brightly illuminated whenever the door is opened.

What I claim is—

1. An oven heated from without having relatively cool sides lined with relatively strong reflecting-surfaces, substantially as described.

2. An oven heated from without having its heat-transmitting walls lined with relatively strong radiating-surfaces and its other walls lined with relatively strong reflecting-surfaces, substantially as described.

In testimony whereof I sign this specification in the presence of two witnesses.

FREDERICK W. KING.

Witnesses:
 EDWARD C. CURTISS,
 FRANK A. JEFFREY.